(12) United States Patent
Otani

(10) Patent No.: US 7,594,129 B2
(45) Date of Patent: Sep. 22, 2009

(54) METHOD AND APPARATUS FOR REDUCING CURRENT FLOW IN BUS IN NONOPERATING STATE

(75) Inventor: Atsushi Otani, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 780 days.

(21) Appl. No.: 11/208,675

(22) Filed: Aug. 22, 2005

(65) Prior Publication Data

US 2006/0047985 A1    Mar. 2, 2006

(30) Foreign Application Priority Data

Aug. 31, 2004   (JP) .............................. 2004-252314

(51) Int. Cl.
*G06F 1/32*   (2006.01)
(52) U.S. Cl. ....................................... 713/300
(58) Field of Classification Search .................. 713/300
See application file for complete search history.

(56) References Cited

U.S. PATENT DOCUMENTS

| | | | | |
|---|---|---|---|---|
| 4,311,927 A | * | 1/1982 | Ferris | .............................. 326/56 |
| 5,590,082 A | | 12/1996 | Abe | |
| 5,659,763 A | | 8/1997 | Ohashi et al. | |
| 5,761,129 A | * | 6/1998 | Roe et al. | .............. 365/189.02 |
| 5,896,331 A | * | 4/1999 | Crafts | ......................... 365/201 |
| 5,959,925 A | * | 9/1999 | Tatsumi | ....................... 365/222 |
| 7,260,013 B2 | * | 8/2007 | Park et al. | .................... 365/226 |
| 7,275,130 B2 | * | 9/2007 | Klein | ......................... 711/105 |
| 2003/0033472 A1 | | 2/2003 | Yano | |

FOREIGN PATENT DOCUMENTS

| | | |
|---|---|---|
| JP | H04-236682 A | 8/1992 |
| JP | 7-334432 A | 12/1995 |
| JP | 2000-250666 A | 9/2000 |
| JP | 2002-7316 A | 1/2002 |
| JP | 2003-59266 A | 2/2003 |
| JP | 2003-271266 A | 9/2003 |
| JP | 2004-287948 A | 10/2004 |

\* cited by examiner

*Primary Examiner*—Thomas Lee
*Assistant Examiner*—Eric Chang
(74) *Attorney, Agent, or Firm*—Canon U.S.A., Inc., IP Division

(57) ABSTRACT

A data storage apparatus includes a data storage unit to store data, a plurality of buffer units to output data to the data storage unit through a bus that includes a plurality of signal lines, the plurality of buffer units being provided on the plurality of signal lines, a determination unit to determine whether the bus is in an operating state in which transmission and reception of data to and from the data storage unit are performed, a reference voltage supply unit to supply a predetermined reference voltage to the plurality of signal lines, a control unit to control, in a case where the determination unit determines that a state of the bus is changed from an operating state to a nonoperating state, the plurality of buffer units to switch output states to predetermined output states to reduce an amount of electric current flowing in the bus.

20 Claims, 8 Drawing Sheets

CL: /CAS LATENCY, BL: BURST LENGTH

BL: BURST LENGTH

METHOD AND APPARATUS FOR REDUCING CURRENT FLOW IN BUS IN NONOPERATING STATE

BACKGROUND OF THE INVENTION

1. Field of the Invention

The present invention relates to a data storage apparatus and to a control method thereof.

2. Description of the Related Art

A method of reducing a drive frequency (or a control cycle) of a controller adapted to control a system, which includes a memory (for instance, a DRAM (Dynamic Random Access Memory)) serving as a data storage unit that stores data (see, for example, Japanese Patent Application Laid-Open No. 2002-7316), is known as a method of reducing the electric power consumption of the system. Also, a method of reducing the power consumption by inhibiting access to a memory through a bus comprising plural signal lines used for transmitting data to and for receiving data from the memory and by causing the memory to perform a self-refresh operation is known (see, for instance, Japanese Patent Application Laid-Open No. 2003-59266). Also, a method of holding data when interrupting power supply to a system, which includes a memory (for example, a DRAM) serving as a data storage unit that stores data, by causing the memory to perform a self-refresh operation and by supplying electric power to the memory from a backup auxiliary power supply is known (see, for example, Japanese Patent Application Laid-Open No. 7-334432). However, these conventional methods have the following drawbacks.

For instance, according to the method described in Japanese Patent Application Laid-Open No. 2002-7316, the drive frequencies of the memory itself and the controller, which controls the memory, are reduced to thereby decrease the power consumptions thereof. However, in a case where an intermediate voltage (for example, 1.25V) of a power supply voltage (for instance, 2.5V) for a memory system is supplied to the plural signal lines of the bus connecting the controller to the memory, even when the memory and the controller are not driven at the predetermined drive frequency, electric current can flow from the power supply, which supplies the intermediate voltage, to the plural signal lines, so that power consumption occurs corresponding to the electric current. Also, the power consumption depends upon the level of a voltage outputted from each of the plural control signal lines. For example, in a case the voltage of the all of the signal lines are set lower than the intermediate voltage, the electric current can flow from the power supply to the all of the signal lines. Incidentally, an SSTL2 (Stub Series Terminated Logic for 2.5V) interface employed in a DDR-SDRAM (Double Data Rate SDRAM) is known as an interface adapted to supply the intermediate voltage (for example, 1.25V) of the power supply voltage (for example, 2.5V) for the memory system.

According to the method described in Japanese Patent Application Laid-Open No. 2003-59266, the power consumption can be reduced by supplying electric power only to the memory. However, this method has a drawback in that it takes time to resume transmission/reception of data between the controller and the memory.

According to the method described in Japanese Patent Application Laid-Open No. 7-334432, electric current flowing into the bus from a buffer provided at an output terminal of the controller, from which data is outputted to the memory, can be reduced by causing the memory to perform a self-refresh operation, by also supplying electric power to the memory from the backup auxiliary power supply, and by putting the buffer into a high impedance state. However, this method has a drawback in that a data communication rate is lowered when the transmission and reception of data are performed through the bus, which comprises the plural signal lines, in a case of employing a method of inserting a resistor between a ground potential (GND) and the bus.

SUMMARY OF THE INVENTION

The present invention is accomplished in view of the above drawbacks, and is directed to an improved data storage apparatus and to a control method thereof.

More particularly, the present invention is directed to a data storage apparatus capable of reducing an amount of electric current flowing in a bus, which has signal lines supplied with a predetermined reference voltage, through a voltage supply unit in a case where it is determined that the state of the bus is changed from an operating state to a nonoperating state, and is also directed to a control method thereof.

In one aspect of the present invention, a data storage apparatus includes data storage unit adapted to store data, a plurality of buffer units adapted to output data to the data storage unit through a bus, wherein the bus includes a plurality of signal lines, and wherein the plurality of buffer units are provided on the plurality of signal lines, a determination unit adapted to determine whether the bus is in an operating state in which transmission and reception of data to and from the data storage unit are performed, a reference voltage supply unit adapted to supply a predetermined reference voltage to the plural signal lines, and a control unit adapted to control, in a case where the determination unit determines that a state of the bus is changed from an operating state to a nonoperating state, the plurality of buffer units to switch output states to predetermined output states to reduce an amount of electric current flowing in the bus through the reference voltage supply unit.

In another aspect of the present invention, a method of controlling a data storage apparatus includes the steps of determining whether a bus having a plurality of signal lines is in an operating state in which the bus performs transmission and reception of data to and from a data storage unit, and controlling, in a case where a state of the bus is determined in the determining step to be changed from the operating state to a nonoperating state, a plurality of buffer units respectively provided on the plurality of signal lines to switch output states to predetermined output states so as to reduce an amount of electric current flowing in the bus through a reference voltage supply unit adapted to supply a predetermined reference voltage to the bus.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

Figure 1:
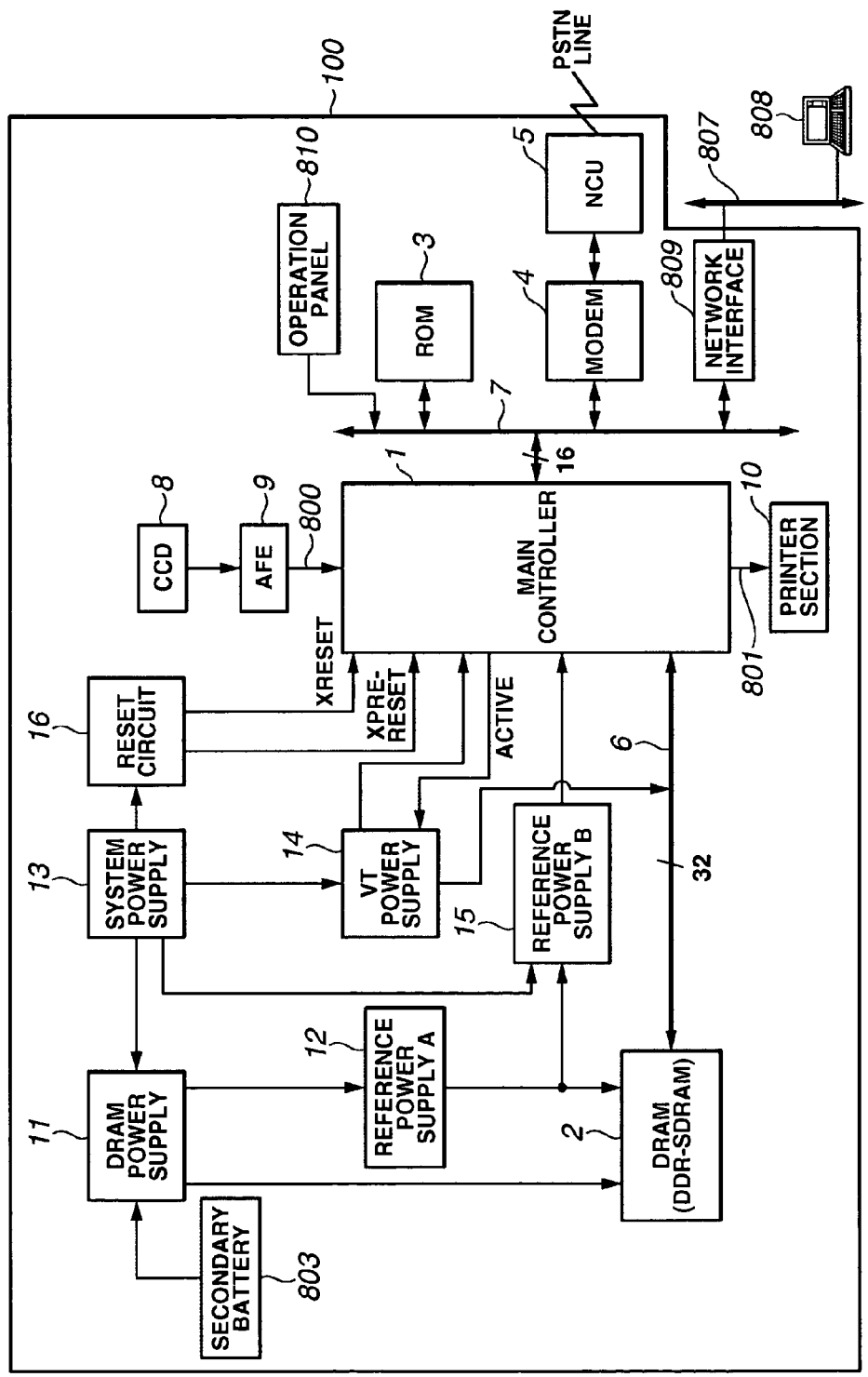
FIG. 1 is a block diagram showing the configuration of an image processing apparatus according to an embodiment of the present invention.

FIG. 1 is a block diagram showing the configuration of an embodiment of the present invention.

In FIG. 1, reference numeral 100 designates an image processing apparatus that performs image processing according to image data received from an external host computer 808 or from a facsimile connected thereto through a PSTN line (or a public telephone line), and that forms an image on, for example, a sheet of paper.

In FIG. 1, reference numeral 1 denotes a main controller incorporating a CPU. The main controller 1 also incorporates in the circuit thereof an image processing block, which processes image data received from a CCD 8 (to be described later), a CPU 111 adapted to control the entire main controller 1, peripheral circuits, and various kinds of interface circuits interfacing with other circuits. The main controller 1 has a 16-bit general-purpose bus 7, a DRAM bus 6 used for performing transmission and reception of data to and from a DRAM, a scanner interface 800, and a printer interface 801 as interfaces connected to external devices. The general-purpose bus 7 is connected to devices, such as a ROM 3, which stores a system program used by the main controller 1, and a modem 4.

In FIG. 1, reference numeral 2 designates a DRAM that is connected to the DRAM bus 6 and that is used as a work area for the CPU 111 of the main controller 1 and the image processing block, and as an image data holding memory. Although various types of DRAMs may be used as the DRAM 2, a DDR-SDRAM (Double Data Rate SDRAM) according to memory standards enabling high-speed memory transfer by doubling the memory bus clock frequency of an SDRAM is employed in this embodiment. The DRAM bus 6 is compliant with the SSLT2 (Stub Series Terminated Logic for 2.5V) standard and supplies the intermediate voltage (for example, 1.25V) of the power supply voltage (for instance, 2.5V) to the signal lines. Incidentally, according to the SSTL2 standard, the voltage level of each of the signal lines of the DRAM bus 6, which signal level is equal to or higher than 1.6V that is higher than a reference potential level (VREF) of 1.25V by 0.35V, is regarded as a high (H) level. Conversely, the signal level of each of the signal lines of the DRAM bus 6, which signal level is equal to or lower than 0.9V that is lower than the reference potential level by 0.35V, is regarded as a low (L) level.

As shown in FIG. 1, the scanner interface 800 is connected to the CCD 8 through an analog front end (AFE) 9. The CCD 8 reads an original as image data, and transmits the read image data to the main controller 1 through the scanner interface 800. The printer interface 801 is connected to a printer section 10 that forms an image on a sheet of paper by an electrophotographic system. The printer section 10 receives image data rasterized in the DRAM 2 through the DRAM bus 6 and the main controller 1 and subsequently forms an image on a sheet of paper according to the received image data.

As shown in FIG. 1, the modem 4 is connected to a NCU (Network Control Unit) 5 connected to a PSTN line (or public telephone line). The modem 4 can transmit image data, which is received from the main controller 1, to the external facsimile through the PSTN line by modulating the image data and transmitting the modulated image data to the NCU 5. The NCU 5 can receive facsimile data transmitted from the external facsimile through the PSTN line.

In FIG. 1, reference numeral 809 designates a network interface that is a circuit interfacing with the host computer 808 through a LAN (Local Area Network). The network interface 809 receives print data, which includes information on image data to be processed at the image processing apparatus 100, from the external host computer 808.

In FIG. 1, reference numeral 810 denotes an operation panel used for performing various setting operations according to instructions from an operator (or user) so as to form images in the printer section 10 according to the data representing the original read by the CCD 8 in the image processing apparatus 100. The operation panel 810 employs, for example, a touch panel system and is used for inputting information on options to select, such as the number of images to form, densities at which the images are formed, and a reading resolution (for instance, 300 dpi or 600 dpi) at which the CCD 8 reads originals.

A system power supply 13 shown in FIG. 1 supplies voltages to the main controller 1, the ROM 3, the modem 4, and the NCU 5. A termination power supply (or VT power supply) 14 generates an intermediate voltage that is compliant with the SSTL2 standard referenced for interface with the DRAM (or DDR-SDRAM) 2. A termination voltage generated by the VT power supply 14 is applied to the main controller 1 and each of the signal lines of the DRAM bus 6. Incidentally, the main controller 1 outputs an ACTIVE signal to the VT power supply 14. This ACTIVE signal is used for determining whether communication between the main controller 1 and the DRAM 2 through the DRAM bus 6 is in an active state (that is, determining which of an operating state, in which there is an access to the DRAM bus 6, and a nonoperating state in which there is no access thereto the state of the apparatus is). If it is determined according to this signal sent from the main controller 1 that the communication between the main controller 1 and the DRAM 2 is active, the VT power supply 14 supplies a termination voltage (for example, 1.25V) to the DRAM bus 6. Otherwise, the VT power supply 14 supplies no voltage to the DRAM bus 6.

In FIG. 1, reference numeral 11 designates a DRAM power supply supplied with voltages from either the system power supply 13 or secondary battery 803. When the system power supply 13 is in an on-state, the DRAM power supply 11 is supplied with a voltage from the system supply 13 and supplies the DRAM 2 with a voltage used for driving the DRAM 2. Conversely, when the system power supply 13 is in an off-state, the DRAM power supply 11 is supplied with a voltage from the secondary battery 803 and supplies the DRAM 2 with a voltage used for driving the DRAM 2. Incidentally, the capacity of electric current supplied from the secondary battery 803 to the DRAM 2 is less than that of electric current supplied from the system power supply 13. Thus, the secondary battery 803 serves as a backup power supply on condition that the DRAM 2 is in a self-refresh mode.

In FIG. 1, reference numeral 12 denotes a reference power supply A that is supplied with a voltage from the DRAM power supply 11 and that generates a reference voltage which is half the power supply voltage from the system power supply 13 and is used for determining an SSTL2 level. A reference power supply B 15 generates a voltage that is substantially equal to the voltage generated by the reference power supply A 12. Although the reference power supply B 15 is supplied with a voltage from the reference power supply A 12 so as to generate the same voltage as that generated by the reference power supply A 12, the system power supply 13 is used as a source power supply for enabling the reference power supply A 12 to generate the voltage. Therefore, when the system power supply 13 is in an off-state, no voltage is supplied from the system power supply 13 to the reference power supply B, so that the reference voltage, which is half the power supply voltage supplied from the system power supply 13, is not generated by the reference power supply B. This power supply B is configured in this manner so that the voltage is prevented from being applied to the main controller 1 from the reference power supply B in a case where the system power supply 13 is in an off-state, and where the entire memory system is in a nonoperating state.

In FIG. 1, reference numeral 16 denotes a reset circuit that monitors a voltage outputted by the system power supply 13, and that transmits, when the voltage is equal to or less than a predetermined value, an XPRE-RESET signal and an XRE-SET signal, which is obtained by delaying the XPRE-RESET signal, to the main controller 1 to thereby inform the main controller 1 in advance that the power supply to the entire memory system is put into an off-state.

Next, the internal circuits of the main controller 1 are described with reference to FIG. 2.

Figure 2:
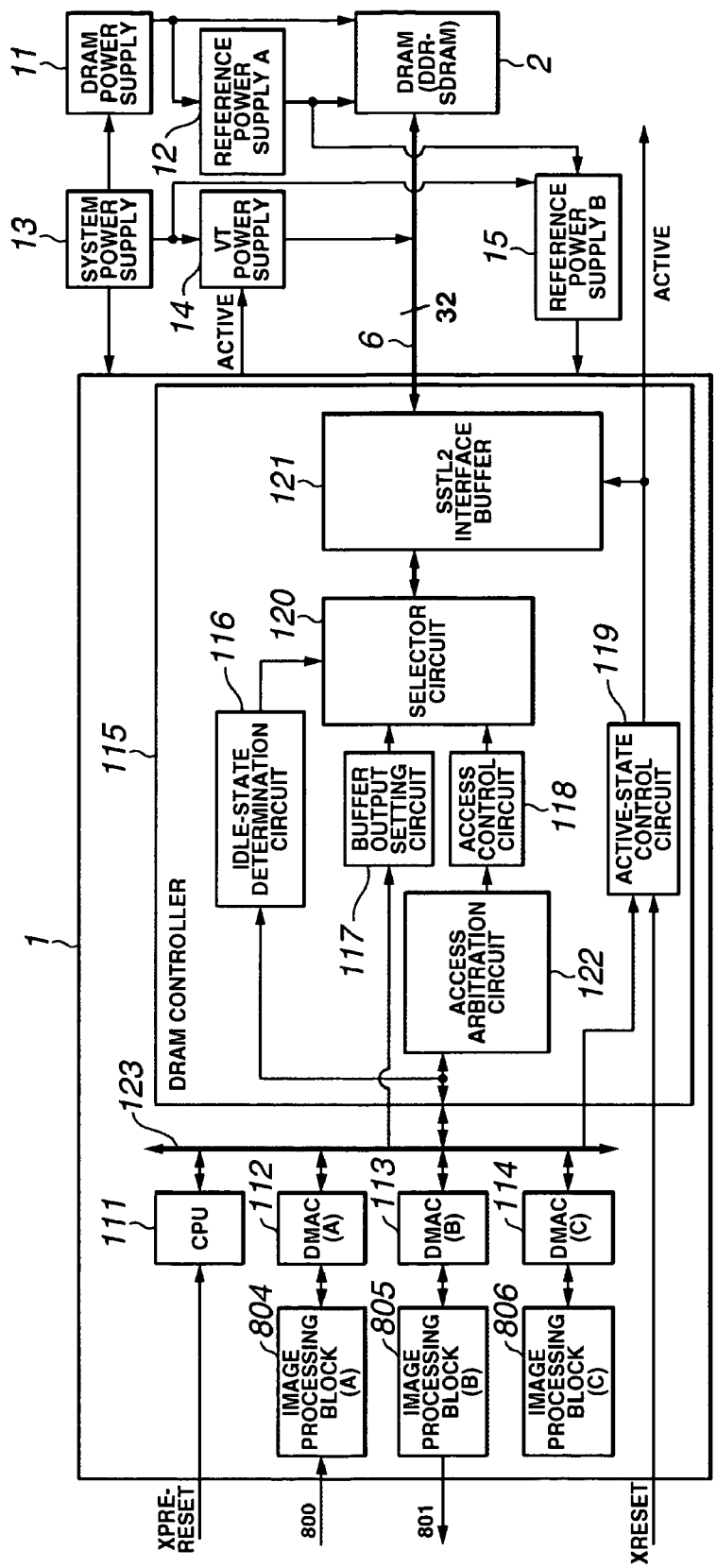
FIG. 2 is a block diagram showing the configuration of a memory system having an internal circuit incorporated into a main controller 1.

FIG. 2 is a block diagram showing the configuration of the memory system including the internal circuits incorporated into the main controller 1.

The CPU 111 shown in FIG. 2 controls the entire main controller 1 and is connected to a system bus 123 used for performing transmission and reception of data and control signals among plural internal circuits of the main controller 1.

In FIG. 2, reference numeral 112 designates a DMAC (A) that is a control circuit adapted to receive image data, which is inputted from the scanner interface 800 and is processed by the image processing block (A) 804, and to perform DMA (Direct Memory Access)-transfer of the inputted image data to the DRAM 2. Incidentally, the image processing block (A) 804 is a circuit block having the function of performing shading correction (that is, brightness correction on image data of 1 line in the main scanning direction (that is, a direction perpendicular to a direction in which the original is conveyed), which is read from the original).

In FIG. 2, reference numeral 113 denotes a DMAC (B) that is a control circuit adapted to perform DMA-transfer of data, which is stored in the DRAM 2, to the image processing block (B) through the system bus 123. Incidentally, the image processing block (B) is a circuit block having the function of performing, for example, predetermined smoothing processing on the inputted image data and also transmitting the processed image data to the printer interface 801 so as to cause the printer section to form images according to the image data.

In FIG. 2, reference numeral 114 designates a DMAC (C) that is a control circuit adapted to perform DMA-transfer of the data, which is stored in the DRAM 2, to the image processing block (C) 806 through the system bus 123. Incidentally, the image processing block (C) 806 is a circuit block having the function of performing, for example, image data format conversion (for instance, converting bit-mapped image data to JPEG image data) on the inputted image data and also transmitting the converted image data to the DMAC (C) 114 so as to perform DMA-transfer of the converted image data to the DRAM 2.

In FIG. 2, reference numeral 115 denotes a DRAM controller that arbitrates access-requests to the DRAM 2 from the CPU 111, the DMAC (A) 112, the DMAC (B) 113 and the DMAC (C) 114 and that controls accesses to the DRAM 2.

In FIG. 2, reference numeral 122 designates an access arbitration circuit that performs a control operation of determining, in a case where access requests to the DRAM 2 are simultaneously made by the CPU 111, the DMAC (A) 112, the DMAC (B) 113 and the DMAC (C) 114, which of the access requests respectively made by the DMACs has highest priority, and causing the DMAC, whose access request has highest priority, to perform DMA-transfer of the data to the DRAM 2.

In FIG. 2, reference numeral 116 denotes an idle-state determination circuit that determines whether at least one of the DMAC (A) to the DMAC (C) connected thereto through the system bus 123 makes an access request to the DRAM 2. In a case where at least one of the DMAC (A) to the DMAC (C) connected thereto through the system bus 123 makes an access-request to the DRAM 2, the idle-state determination circuit 116 outputs a signal, which indicates that the DRAM bus 6 is in an operating state, to the selector circuit 120 (to be described later). In a case where none of the DMAC (A) to the DMAC (C) connected thereto through the system bus 123 makes an access-request to the DRAM 2, the idle-state determination circuit 116 outputs a signal, which indicates that the DRAM bus 6 is in a nonoperating state, to the selector circuit 120.

In FIG. 2, reference numeral 118 designates an access control circuit that performs setting of an address used for accessing the DRAM 2 and output levels of various control signals according to a signal representing a request for using the DRAM bus 6, which is made by the DMAC that is selected by the access arbitration circuit 122 and that performs the transfer of data to the DRAM 2.

In FIG. 2, reference numeral 117 denotes a buffer output setting circuit that sets the output level of each of the buffer circuits of the SSTL2 interface buffer 121 (to be described later) in a nonoperating state in which none of the DMAC (A) to the DMAC (C) makes an access-request to the DRAM 2. The buffer output setting circuit sets the output level of each of the buffer circuits according to a control signal received from the CPU 111 through the system bus 123.

The selector circuit 120 shown in FIG. 2 selects one of a signal outputted from the access control circuit 118 and a signal outputted from the buffer output setting circuit 117 as a signal to be outputted to the SSTL2 interface buffer 121, according to a signal, which is received from the idle-state determination circuit 116. In a case where a signal, which indicates that the DRAM bus 6 is in an operating state, is received from the idle-state determination circuit 116, the selector circuit 120 causes the data, which is outputted from the access control circuit 118, to be outputted to the SSTL2 interface buffer 121. In a case where a signal, which indicates that the DRAM bus 6 is in a nonoperating state, is received from the idle-state determination circuit 116, the selector circuit 120 causes the data, which is outputted from the buffer output setting 117, to be outputted to the SSTL2 interface buffer 121.

The SSTL2 interface buffer 121 shown in FIG. 2 is used for receiving a signal outputted from the selector circuit 120 and for outputting the received signal to each of the plural signal lines of the DRAM bus 6.

In FIG. 2, reference numeral 119 designates an active-state control circuit that outputs to the SSTL2 interface buffer 121 a control signal for switching the state of the plural buffer circuits of the SSTL2 interface buffer 121 between an active state, in which a signal is outputted to the DRAM bus 6, and a nonactive state in which no signal is outputted to the DRAM bus 6. In a case where the active-state control circuit 119 receives a control signal, which stops an output of a signal from the SSTL2 interface buffer 121 to the DRAM bus 6, from the CPU 111 through the system bus 123, the active-state control circuit 119 outputs a control signal putting the SSTL2 interface buffer 121 and the DRAM bus 6 into a state in which the SSTL2 interface buffer 121 and the DRAM bus 6 are electrically separated from each other (that is, a high impedance state). Also, in a case where the active-state control circuit 119 receives an XRESET signal from the reset circuit 16, the active-state control circuit 119 outputs a control signal so that the SSTL2 interface buffer 121 and the DRAM bus 6 are in a high impedance state.

Incidentally, the case, in which the active-state control circuit 119 receives a control signal, which stops an output of a signal from the SSTL2 interface buffer 121 to the DRAM buffer 6, from the CPU 111 through the system bus 123, is a case where the CPU 111 of the main controller 1 determines that the state of the image processing apparatus 100 should be changed to a predetermined power-saving state. The CPU 111 transmits a control signal, which stops an output of a signal to the DRAM bus 6, to the active-state control circuit 119 in the following cases (1), (2), and (3). That is, (1) the CPU 111 determines that the network interface 809 does not receive print data, which includes image data representing an image formed by the image processing apparatus 100, from the external host computer 808 through the LAN 807 for a predetermined time. (2) The CPU 111 determines that the NCU 5 does not receive print data, which includes image data representing an image formed by the image processing apparatus 100, from the external facsimile through the PSTN line for a predetermined time. (3) The CPU 111 determines that the operation panel 810 does not accept an instruction inputted by an operator for a predetermined time.

Incidentally, the case, in which the active-state control circuit 119 receives an XRESET signal from the reset circuit 16, is a case where the reset circuit 16 outputs an XRESET signal to the active-state control circuit 119 in response to interruption of supply of the power supply voltage from a commercial power supply to the system power supply 13, which is caused by using a switch that is provided in the image processing apparatus 100 and that switches the state of the image processing apparatus 100 between an operating state (that is, the power supply is ON) and a nonoperating state (that is, the power supply is OFF).

FIG. 2 shows the fact that the XRESET signal is connected to the active-state control circuit 119. However, this XRESET signal is outputted to each circuit block of the main controller 1 as a reset signal for resetting the entire main controller 1.

Figure 3:
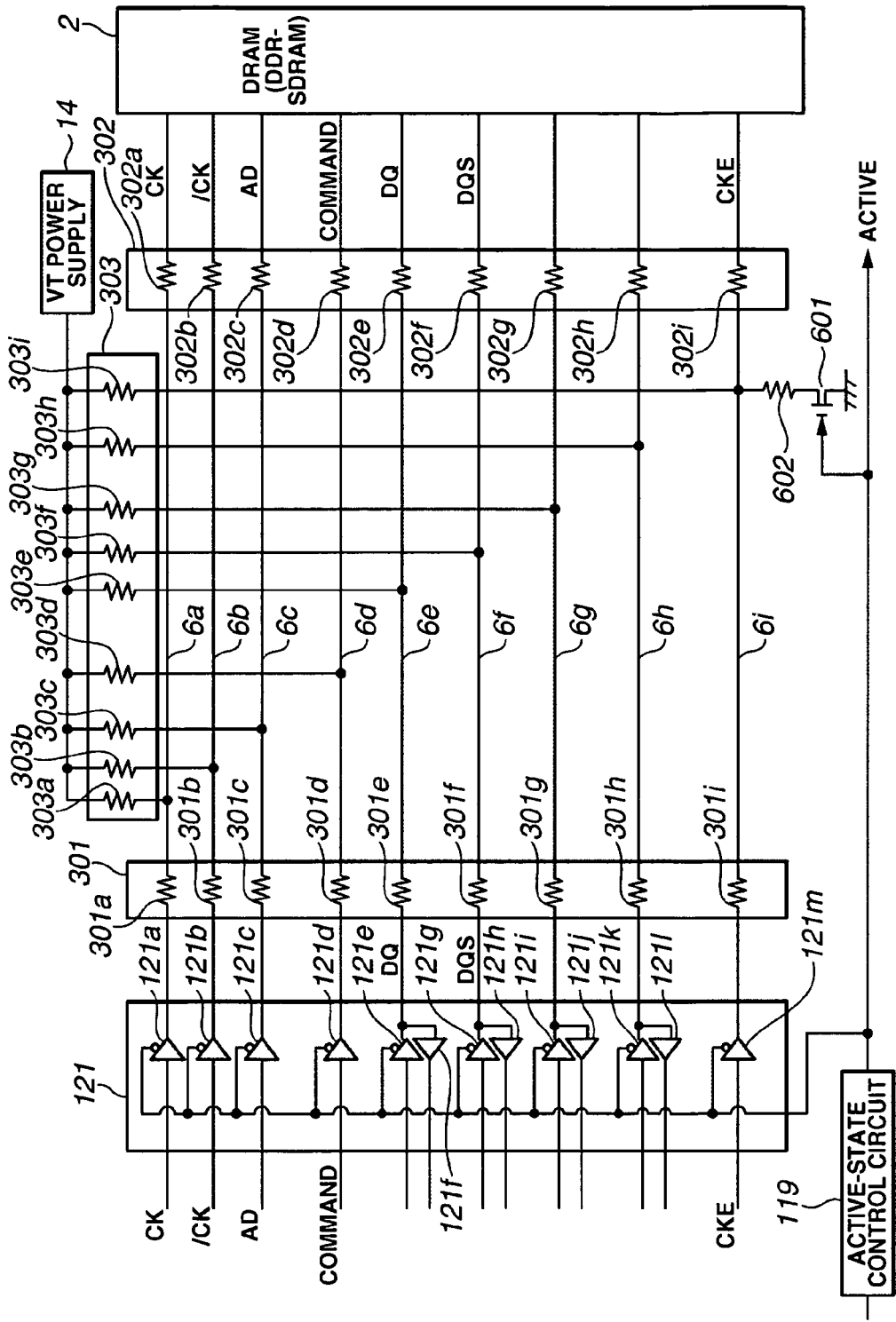
FIG. 3 is a diagram showing the connection configuration between an SSTL2 interface buffer 121 and a DRAM 2.

Next, the connection configuration between the SSTL2 interface buffer 121 and the DRAM 2, which are connected through the DRAM bus 6, is described by referring to FIG. 3.

FIG. 3 is a diagram showing the connection configuration between the SSTL2 interface buffer 121 and the DRAM 2.

In FIG. 3, reference character 121a denotes an output buffer that is a buffer circuit used for causing the DRAM controller 115 to output a clock signal (CK) to the DRAM 2. Reference characters 121b, 121c, 121d, and 121m also designate output buffers used for causing the DRAM controller 115 to output to the DRAM 2 a signal (/CK) obtained by reversing the clock signal (CK), an address signal (AD), a control command signal (COMMAND), and a clock enable signal (CKE).

In FIG. 3, reference characters 121e and 121g denote output buffers that cause the DRAM controller 115 to output a data signal (DQ) and a data strobe signal (DQS) to the DRAM 2, respectively. Reference characters 121i and 121k also designate output buffers that are configured similarly to those 121e and 121g and that cause the DRAM controller 115 to output signals to the DRAM 2, respectively.

In FIG. 3, reference characters 121f and 121h denote input buffers that cause the DRAM 2 to input a data signal (DQ) and a data strobe signal (DQS) to the DRAM controller 115, respectively. Reference characters 121j and 121l also designate input buffers that are configured similarly to those 121f and 121h and that cause the DRAM 2 to input signals to the DRAM controller 115, respectively.

As shown in FIG. 3, control signals are inputted from the active-state control circuit 119 to the output buffers 121a, 121b, 121c, 121d, 121e, 121g, 121i, 121k, and 121m. In a state in which each of the output buffers of the SSTL2 interface buffer 121 does not receive a control signal (that is, an enable signal), which indicates that a signal is outputted to the DRAM bus 6, from the active-state control circuit 119, the output buffers and each signal line (6a to 6h) of the DRAM bus 6 are in a state in which the output buffers and the DRAM bus 6 are electrically separated from one another (that is, a high impedance state). Thus, when the output buffers are in the high impedance state, the output buffers and the DRAM bus 6 are in a state in which the output buffers and the DRAM bus 6 are electrically separated from one another. Consequently, electric power, which is consumed when electric currents flow in the output buffers through the VT power supply 14, is not consumed in the high impedance state. Incidentally, in a state in which each of the output buffers of the SSTL2 interface buffer 121 receives a control signal (that is, an enable signal), which indicates that the active-state control circuit 119 outputs a signal to the DRAM bus 6, the output buffers and the signal lines of the DRAM bus 6 are in a state in which the output buffers and the signal lines are electrically connected to one another (that is, a low impedance state). In this low impedance state, signals inputted to the output buffers are then outputted to the signal lines 6a to 6h of the DRAM bus 6 as they are.

In FIG. 3, reference numerals 301 and 302 are resistors. Resistors 301a and 302a are series-connected to a signal line 6a of the DRAM bus 6. Resistors 301b and 302b are series-connected to a signal line 6b. Resistors 301c and 302c are series-connected to a signal line 6c. Resistors 301d and 302d are series-connected to a signal line 6d. Resistors 301e and 302e are series-connected to a signal line 6e. Resistors 301f and 302f are series-connected to a signal line 6f. Resistors 301g and 302g are series-connected to a signal line 6g. Resistors 301h and 302h are series-connected to a signal line 6h. Resistors 301i and 302i are series-connected to a signal line 6i.

In FIG. 3, reference numeral 303 denotes resistors adapted to pull up the voltages, which are supplied to the signal lines 6a to 6i of the DRAM bus 6, to the termination voltage. In FIG. 3, the power supply voltage supplied from the VT power supply 14 is supplied to the signal line 6a through the resistor 303a. The power supply voltage is supplied to the signal line 6b through the resistor 303b. The power supply voltage is supplied to the signal line 6c through the resistor 303c. The power supply voltage is supplied to the signal line 6d through the resistor 303d. The power supply voltage is supplied to the signal line 6e through the resistor 303e. The power supply voltage is supplied to the signal line 6f through the resistor 303f. The power supply voltage is supplied to the signal line 6g through the resistor 303g. The power supply voltage is supplied to the signal line 6h through the resistor 303h. The power supply voltage is supplied to the signal line 6i through the resistor 303i.

Incidentally, the SSTL2 interface buffer 121 shown in FIG. 3 has been described as comprising five output buffers (121a to 121d, 121m) and four pairs of input/output buffers (that is, input/output buffers 121e and 121f, input/output buffers 121g and 121h, input/output buffers 121i and 121j, and input/output buffers 121k and 121l). However, the number of output buffers and the number of input/output buffers are optionally determined according to a circuit configuration.

Next, a method of setting an output state of each of the output buffers of the SSTL2 interface buffer 121 in such a way as to reduce the power consumption corresponding to each of the signal lines of the DRAM bus 6 in a nonoperating state, in which there is no access to the DRAM bus 6, is described with reference to FIGS. 4 and 5.

Figure 4:
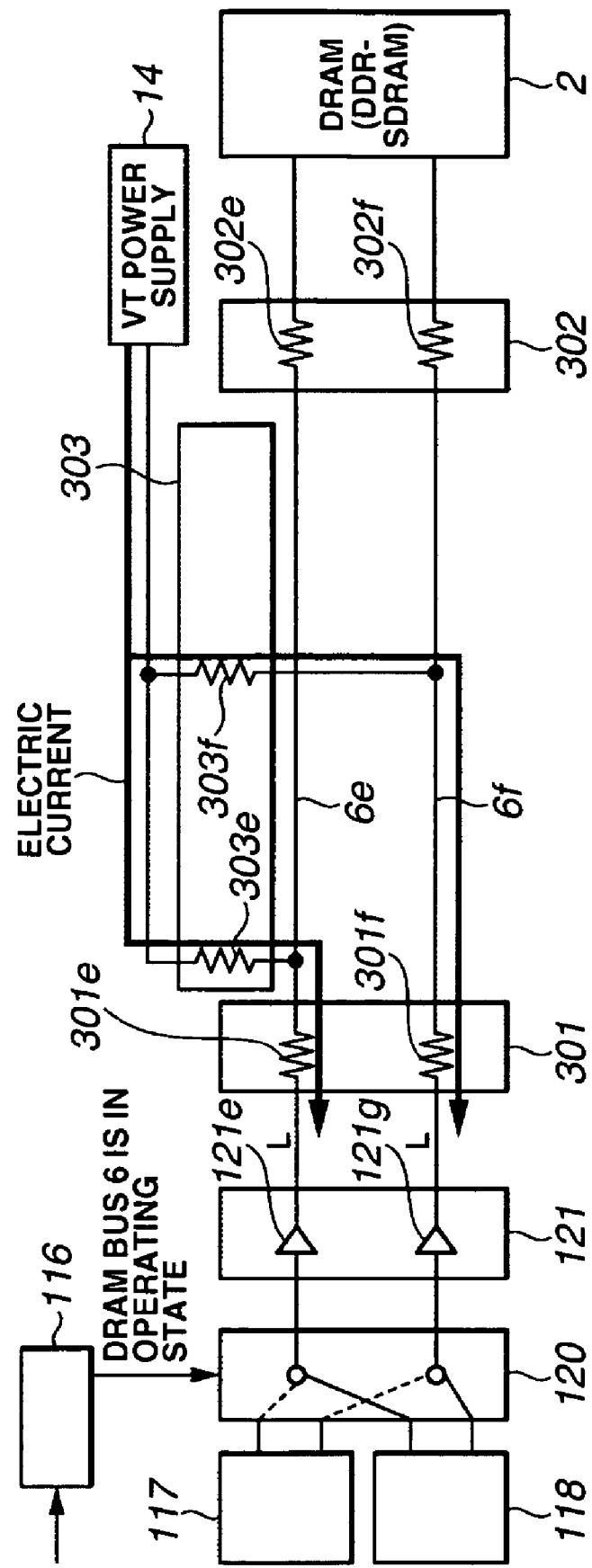
FIG. 4 is a diagram showing the levels of output signals of plural output buffers 121e and 121g in a case where a DRAM bus 6 is in an operating state.

FIG. 4 is a diagram showing the levels of output signals of the plural output buffers 121e and 121g in a case where the DRAM bus 6 is in an operating state. FIG. 5 is a diagram showing the levels of output signals of the plural output buffers 121e and 121g in a case where the DRAM bus 6 is in a nonoperating state.

Incidentally, as described above, the number of the output buffers of the SSTL2 interface buffer 121 can optionally be set. However, the description of FIGS. 4 and 5 is given concerning only the two signal lines 6e and 6f and only the two output buffers 121e and 121g connected to these signal lines, for simplicity of description.

First, in a case where an access request to the DRAM bus 6 is inputted from at least one of the CPU 111, the DMAC (A) 112, the DMAC (B) 113, and the DMAC (C) to the access arbitration circuit 122, the idle-state determination circuit 116 outputs to the selector circuit 120 a signal indicating that the DRAM bus 6 is in an operating state. In this case, the selector circuit 120 selects signals so that signals inputted thereto from the access control circuit 118 are outputted to the two output buffers 121e and 121g of the SSTL2 interface buffer 121. Incidentally, in this case, the selector circuit 120 does not output the signals, which are inputted from the buffer output setting circuit 117, to the two output buffers 121e and 121g of the interface buffer 121.

As shown in FIG. 4, the output buffers are configured so that a predetermined voltage of, for example, about 1.25V (that is, half the system power supply voltage that is 2.5V) is applied to the DRAM bus 6, which is compliant with the SSTL2 standard, from the VT power supply 14 in a case where both the output levels of the two output buffers 121e and 121g are an L-level (that is, the low level (for instance, 0)) when an access request to the DRAM bus 6 from the specific DMAC is finished. Thus, electric current flows from the VT power supply 14, which is at a high voltage level, into each of the output buffers 121e and 121g that are at a low voltage level. Then, electric current flows into each of the resistors 301e, 303e, 301f, and 303f, so that electric power is consumed.

Although the output level is not necessarily equal to the value shown in FIG. 4 when the access request to the DRAM bus 6 from the specific DMAC is finished, electric current flows in each of the resistors 301e, 303e, 301f, and 303f at least until the DRAM bus 6 is in an operating state again, in a case where the DRAM bus 6 is in a nonoperating state by maintaining the output level shown in FIG. 4. Thus, electric power is consumed.

Then, in the first embodiment, at least one of the two output buffers 121e and 121g is switched in response to change of the state of the DRAM bus 6 from an operating state to a nonoperating state. Thus, an amount of electric current flowing through each of the resistors 301e, 303e, 301f, and 303f is reduced as much as possible. Consequently, the power consumption is reduced.

As described above, FIG. 5 is a diagram showing the levels of output signals of the plural output buffers 121e and 121g in a case where the DRAM bus 6 is in a nonoperating state.

As shown in FIG. 4, an access request to the DRAM bus 6 is inputted to the access arbitration circuit 122 from at least one of the CPU 111, the DMAC (A) 112, the DMAC (B) 113, and the DMAC (C) 114. The idle-state determination circuit 116 outputs a signal, which indicates that the DRAM bus 6 is in an operating state, to the selector circuit 120. Thereafter, in a case where none of the CPU 111, the DMAC (A) 112, the DMAC (B) 113, and the DMAC (C) 114 inputs an access request to the DRAM bus 6 to the access arbitration circuit 122, the idle-state determination circuit 116 outputs a signal, which indicates that the DRAM bus 6 is in a nonoperating state, to the selector circuit 120. In this case, the selector circuit 120 selects a signal so that a signal inputted from the buffer output setting circuit 117 is outputted to the two output buffers 121e and 121g of the SSTL2 interface buffer 121. Incidentally, in this case, the selector circuit 120 does not output the signal, which is inputted from the access control circuit 118, to the two output buffers 121e and 121g of the SSTL2 interface buffer 121.

Figure 5:
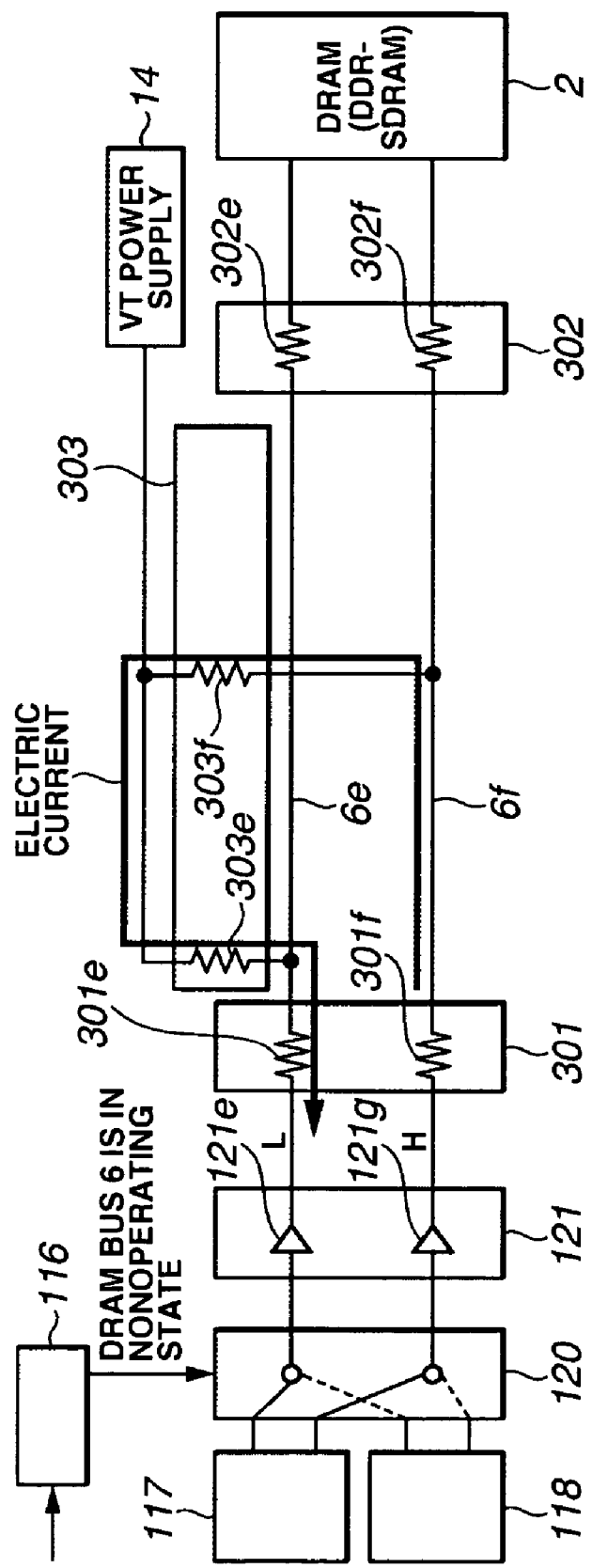
FIG. 5 is a diagram showing the levels of output signals of the plural output buffers 121e and 121g in a case where the DRAM bus 6 is in a nonoperating state.

In a case where the output level of the output buffer 121e is an L-level (that is, a low level), while the output level of the output buffer 121g is an H-level (that is, a high level (for instance, 2.5)), as shown in FIG. 5, where, for example, the output characteristics of the output buffers 121e and 121g are equivalent to each other, and where the resistance value of the signal line 6e (that is, a combined resistance value of the resistors 301e and 303e) of the signal line 6e is equal to the resistance value of the signal line 6f (that is, a combined resistance value of the resistors 301f and 303f), electric current flows only from the output buffer 121g, whose output level is H, to the output buffer 121e whose output level is L. Thus, electric current from the VT power supply 14 does not flow into the output buffer.

Incidentally, even in a case where the output characteristics of the output buffers 121e and 121g are not equivalent to each other, or where the resistance value of the signal line 6e (that is, a combined resistance value of the resistors 301e and 303e) is not equal to the resistance value of the signal line 6f (that is, a combined resistance value of the resistors 301f and 303f), the power consumption of the memory system can be reduced, as compared with a case where the output levels of the two output buffers are set to be equal to each other (that is, an L-level shown in FIG. 4).

Next, a method of setting the output states of the output buffers of the SSTL2 interface buffer 121 to thereby reduce the power consumption on the signal lines of the DRAM bus 6 in a nonoperating state, in which there is no access to the DRAM bus 6, as described with reference to FIGS. 4 and 5 is described by referring to FIG. 6.

Figure 6:
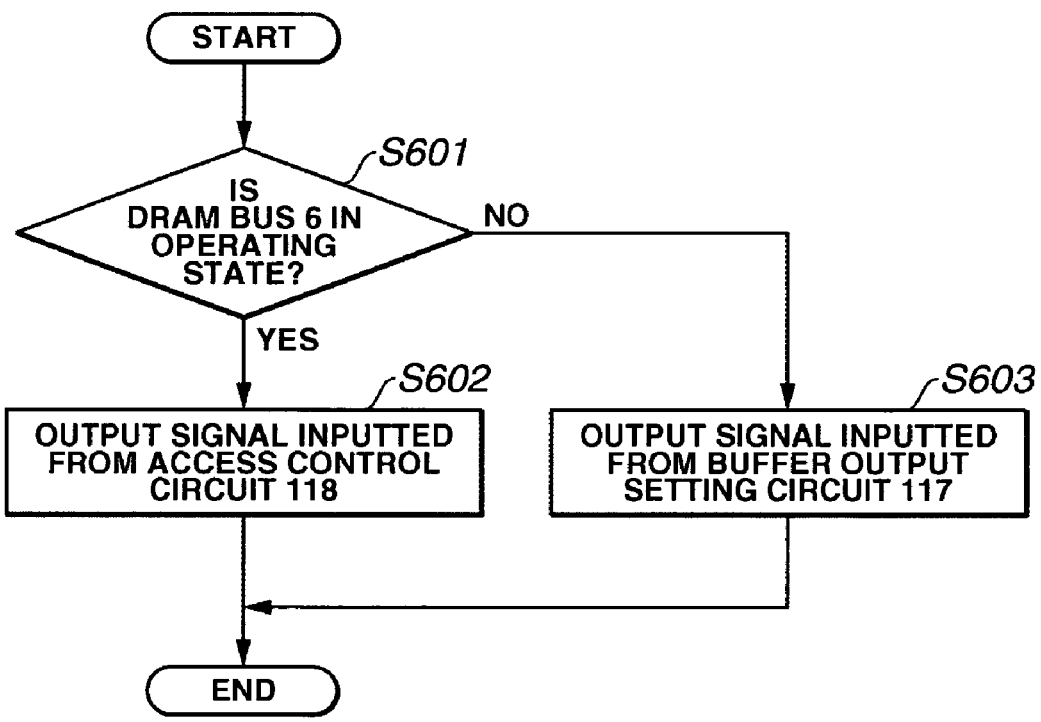
FIG. 6 is a flowchart showing an operation of selecting a signal outputted to the SSTL2 interface buffer 121 by a selector circuit 120.

FIG. 6 is a flowchart showing an operation of selecting a signal outputted to the SSTL2 interface buffer 121 by the selector circuit 120.

In step S601 of FIG. 6, the selector circuit 120 determines according to a signal inputted from the idle-state determination circuit 116 whether the DRAM bus 6 is in an operating state. If determined that the DRAM bus 6 is in an operating state, the operation proceeds to step S602. If determined that the DRAM bus 6 is in a nonoperating state, the operation advances to step S603.

In step S602 shown in FIG. 6, because the DRAM bus 6 is in an operating state, and there is an access request to the DRAM bus 6 from at least one of the CPU 111, the DMAC (A) 112, the DMAC (B) 113, and the DMAC (C) 114, the selector circuit 120 selects a signal so that a signal inputted from the access control circuit 118 is outputted to the SSTL2 interface buffer 121.

In step S603 shown in FIG. 6, because the DRAM bus 6 is in a nonoperating state, and there is no access request to the DRAM bus 6, which is made by the CPU 111, the DMAC (A) 112, the DMAC (B) 113, and the DMAC (C) 114, the selector circuit 120 selects a signal so that a signal inputted from the buffer output setting circuit 117 is outputted to the SSTL2 interface buffer 121.

As is apparent from the flowchart of FIG. 6, when the DRAM bus 6 is in an operating state, the signal inputted from the access control circuit 118 is outputted to the SSTL2 interface buffer 121. Also, the output states (or levels) of the output buffers are put into predetermined output states set by the buffer output setting circuit 117 in response to change of the state of the DRAM bus 6 from an operating state to a nonoperating state (that is, if YES in step S601, processing in step S602 is performed and finished, and thereafter, if NO in step S601, the change of the state of the DRAM bus 6 occurs).

As described above, the output states (or levels) of the output buffers are put into the predetermined ones set by the buffer output setting circuit 117 in response to the change of the state of the DRAM bus 6 from an operating state to a nonoperating state. Thus, an amount of electric current flowing into the DRAM bus 6 through the VT power supply 14 can be reduced while preparing for responding to the subsequent access request to the DRAM bus 6 by maintaining the active state of the DRAM bus 6 (that is, a state in which the output buffer and the DRAM bus 6 are electrically connected to each other).

Incidentally, the description of FIGS. 4 to 6 has been given concerning only the two signal lines 6e and 6f and only the two output buffers 121e and 121g connected to these signal lines, for simplification of description. However, the invention can be applied to a memory system having a given number of output buffers, for example, nine output buffers as shown in FIG. 3. In this case, optimal output values are set in the nine output buffers in response to the state of the DRAM bus 6 from an operating state to a nonoperating state. Then, the apparatus prepares for responding to the subsequent access request to the DRAM bus 6 while maintaining the active state of the DRAM bus 6. Consequently, an amount of electric current flowing in the DRAM bus 6 through the VT power supply 14 can be minimized according to the memory system.

For example, in a case where the output characteristics of the nine output buffers shown in FIG. 3 are equivalent to one another, and where the resistance value characteristics (or combined resistance values) of the nine signal lines 6a to 6i respectively corresponding to the nine output buffers are equivalent to one another, among the nine output buffers, the output levels of the given five of the output buffers are set at an H-level (or high level). Those of the other four output buffers are set at an L-level (or low level). Thus, the power consumption can be reduced without permitting electric current to flow into the DRAM bus 6 from the VT power supply 14. Alternatively, the output levels of the given four of the output buffers are set at an H-level (or high level). Those of the other five output buffers are set at an L-level (or low level). Thus, the power consumption can be reduced without permitting electric current to flow into the DRAM bus 6 from the VT power supply 14. Even in a case where the output characteristics of the nine output buffers differ from one another, and where the resistance value characteristics (that is, the combined resistance values) of the nine signal lines 6a to 6i differ from one another, it is advisable to preliminarily study what combination of the output levels of the nine output buffers minimizes the amount of electric current flowing from the VT power supply 14 into the DRAM bus 6, and to set the output levels of the output buffers in this case as the signal levels of signals outputted by the buffer output setting circuit 117.

Incidentally, instead of preliminarily studying what combination of the output levels of the nine output buffers minimizes the amount of electric current flowing from the VT power supply 14 into the DRAM bus 6, it is recommended that for instance, an electric current sensor for detecting an amount of electric current flowing from the VT power supply 14 into the DRAM bus 6 is provided, that among the plural combinations of signals to be outputted by the buffer output setting circuit, the CPU 111 determines the combination of the output states of the output buffers, which minimizes the power consumption, according to a result of detection by the electric current sensor, and that the combination of the output states of the output buffers, which minimizes the power consumption, is held by the buffer output setting circuit 117.

FIG. 3 illustrates a case where the number of the output buffers is odd (that is, 9). However, in a case where the number of the output buffers is even, and where the output characteristics of the plural output buffers are equivalent to one another, the power consumption can be reduced, without permitting electric current to flow from the VT power supply 14 into the DRAM bus 6, by setting the output levels of a half of the output buffers at H (a high level) and also setting those of the other half of the output buffers at an L-level (a low level).

Figure 7:
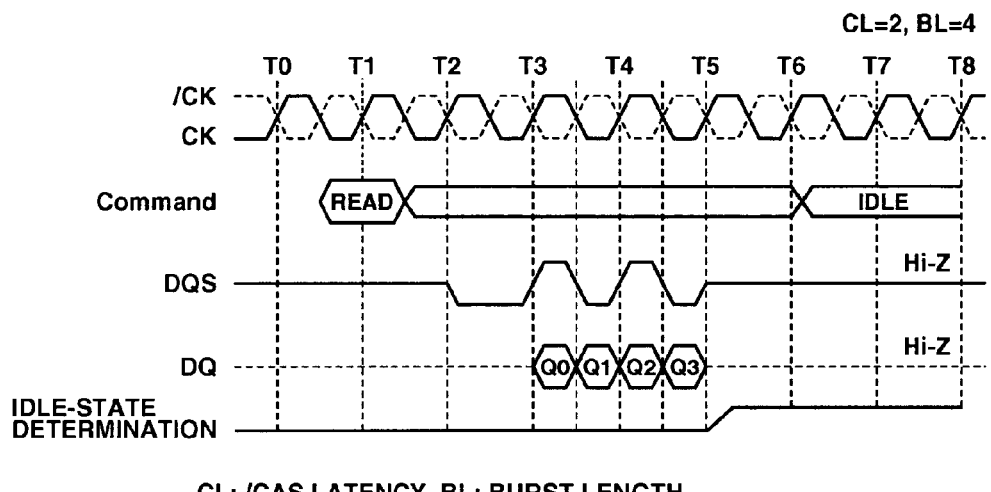
FIG. 7 is a timing chart showing an operation of reading data from the DRAM 2 by a DRAM controller 115.
Figure 8:
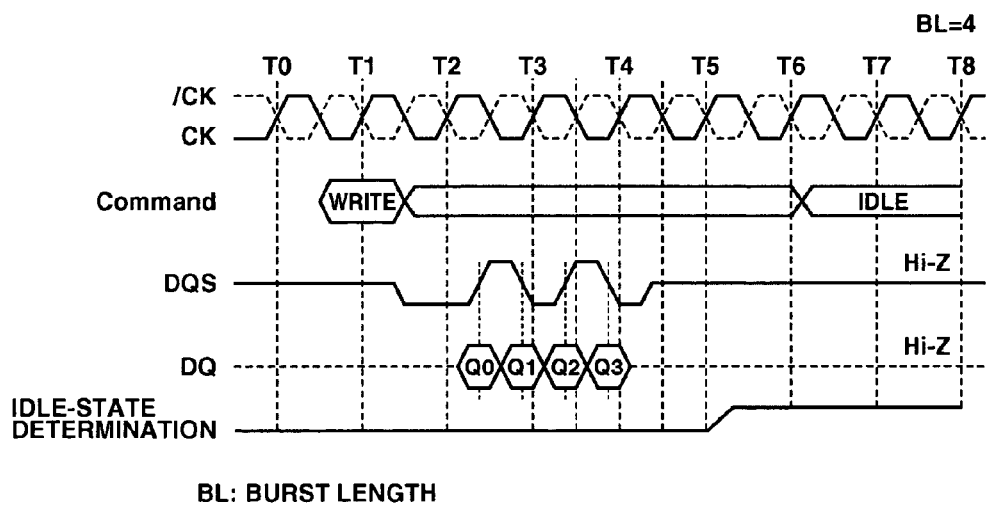
FIG. 8 is a timing chart showing an operation of writing data to the DRAM 2 by the DRAM controller 115.

Next, an operation of reading and writing of data from and to the DRAM 2 by the DRAM controller 115 is described by referring to timing charts of FIGS. 7 and 8.

FIG. 7 is a timing chart showing an operation of reading data from the DRAM 2 by the DRAM controller 115. FIG. 8 is a timing chart showing an operation of writing data to the DRAM 2 by the DRAM controller 115.

In FIG. 7, reference characters T0 to T8 designate moments respectively corresponding to periods of a clock signal (CK), and indicate that this chart shows a total of eight periods per cycle.

An ordinary SDRAM (that is, an SDR-SDRAM) performs a data input/output operation once each single clock cycle. However, a DDR-SDRAM performs a data input/output operation once each half clock cycle (or each half period). Thus, the DDR-SDRAM can perform input/output of data at a speed that is twice the input/output speed of the ordinary SDRAM.

At moment T1 shown in FIG. 7, the DRAM controller 115 transmits a read command to the DRAM 2 through the signal line 6d. Subsequently, the DRAM controller 115 reads data signals DQ from moment T3 in response to change in the signal level of a data strobe signal DQS from or to a high level. When the reading of the data signal from the DRAM 2 is finished at moment T5, the idle-state determination circuit 116 determines that the DRAM bus 6 is in a nonoperating state. At moment T7, the signal level of a control signal outputted from the idle-state determination circuit 116 to the selector circuit 120 is changed from the low level to the high level. Incidentally, an operation of changing a signal, which is outputted by the selector circuit 120 to the SSTL2 interface buffer 121, from a signal, which is outputted by the buffer output setting circuit 117, to a signal, which is outputted by the access control circuit 118, is performed in a T0-cycle preceding the input of the READ command shown in FIG. 7 by one clock cycle (or one period). This suppresses an occurrence of a delay when an access to the DRAM bus 6 from the CPU 111, the DMAC (A) 112, the DMAC (B) 113, or the DMAC (C) 114 is resumed.

In FIG. 8, reference characters T0 to T8 designate moments respectively corresponding to periods of a clock signal (CK), and indicate that this chart shows a total of eight periods per cycle.

At moment T1 shown in FIG. 8, the DRAM controller 115 transmits a write command to the DRAM 2 through the signal line 6d. Subsequently, the DRAM controller 115 writes data signals DQ from moment T2 in response to change in the signal level of a data strobe signal DQS from or to a high level. When the writing of the data signal to the DRAM 2 is finished at moment T4, the idle-state determination circuit 116 determines that the DRAM bus 6 is in a nonoperating state. At moment T7, the signal level of a control signal outputted from the idle-state determination circuit 116 to the selector circuit 120 is changed from the low level to the high level. Incidentally, an operation of changing a signal, which is outputted by the selector circuit 120 to the SSTL2 interface buffer 121, from a signal, which is outputted by the buffer output setting circuit 117, to a signal, which is outputted by the access control circuit 118, is performed in a T0-cycle preceding the input of the WRITE command by one clock cycle (or one period). This suppresses an occurrence of a delay when an access to the DRAM bus 6 from the CPU 111, the DMAC (A) 112, the DMAC (B) 113, or the DMAC (C) 114 is resumed.

FIGS. 4 to 8 illustrate a case where the active-state control circuit 119 outputs a signal indicating that the DRAM bus 6 is in an active state in which an operation of inputting/outputting a signal is performed. However, in a case where the active-state control circuit 119 outputs a signal indicating that the DRAM bus 6 is in an inactive state in which an operation of inputting/outputting a signal is not performed, a following operation shown in FIG. 9 is performed.

Figure 9:
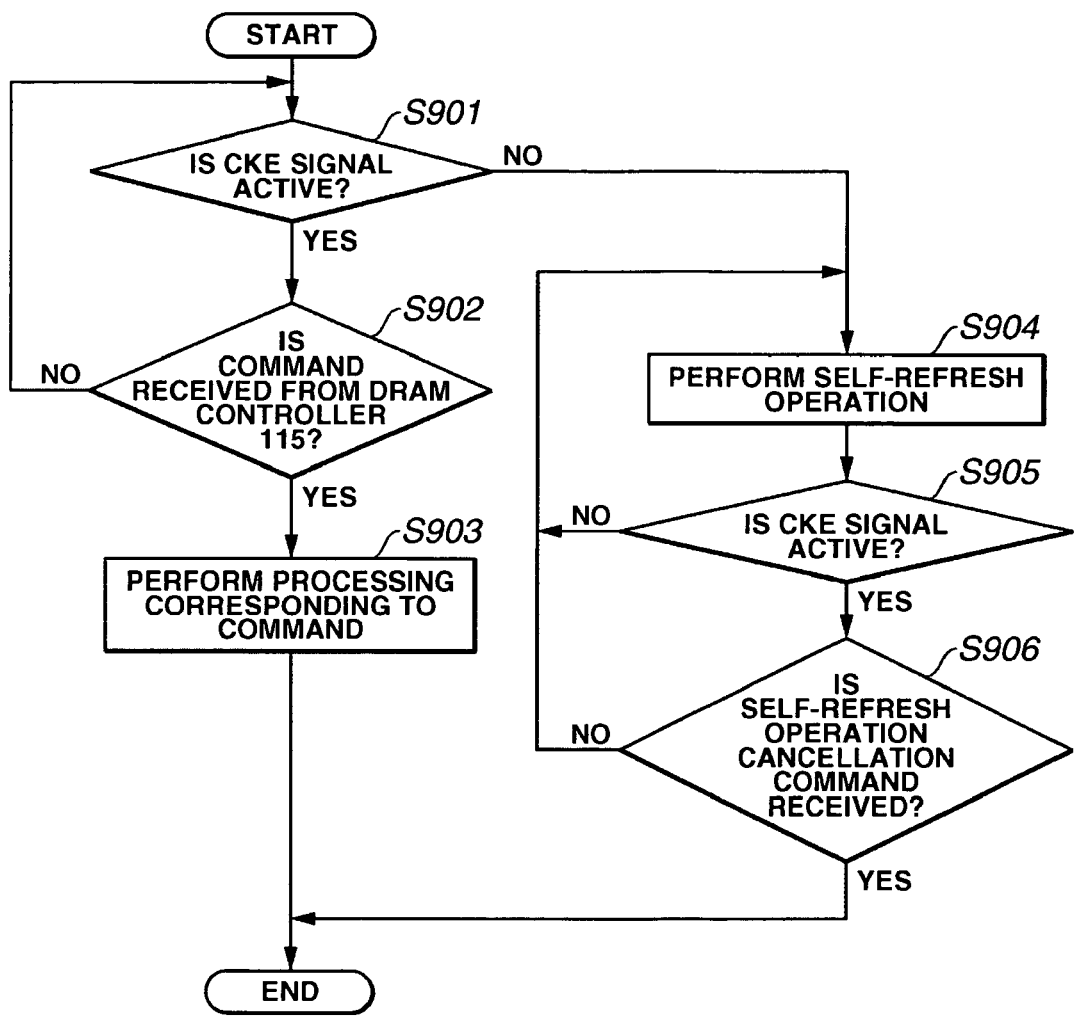
FIG. 9 is a flowchart showing an operation performed by the DRAM 2 according to a signal inputted from the DRAM controller 115 through the DRAM 6.

FIG. 9 is a flowchart showing an operation performed by the DRAM 2 according to a signal inputted from the DRAM controller 115 through the DRAM 6.

In step S901 shown in FIG. 9, the DRAM 2 determines whether a CKE signal inputted thereto through the signal line 6i is active (that is, in a case where this signal is active when this signal has a high signal level, the DRAM 2 determines whether the signal level of the CKE signal is an H-level (a high level)). If this signal is active, the operation proceeds to step S902. Otherwise, the operation advances to step S904.

Incidentally, in a case where the DRAM controller 115 changes a signal, which indicates that the CKE signal is in an active state, to a signal, which indicates that the CKE signal is in an inactive state, the DRAM controller 115 transmits a command (that is, a self-refresh command), which indicates that an operation performed by the DRAM 2 is changed to a self-refresh operation, to the DRAM 2 before the change of the signal. Then, in a case where the DRAM 2 receives the self-refresh command from the DRAM controller 115, the DRAM 2 does not perform an operation corresponding to a command even when a command signal is inputted thereto through the signal line 6d. In a self-refresh state held until a command to cancel the self-refresh operation after the DRAM 2 receives the self-refresh command, the DRAM 2 does not accept a command from the DRAM controller 115. Thus, the DRAM 2 can prevent an occurrence of a malfunction. Incidentally, the case, in which the DRAM controller 115 transmits a self-refresh command to the DRAM 2, is the following cases (1) and (2). That is, (1) the CPU 111 transmits a self-refresh command before the CPU 111 transmits a signal, which indicates that the state of the image processing apparatus 100 is changed to an inactive state, to the active-state control circuit 119 so as to change the state of the image processing apparatus 100 into a power saving mode. (2) The CPU 111 transmits a self-refresh command to the DRAM 2 in response to the reception of an XPRE-RESET signal, which indicates that the state of the power supply for the image processing apparatus 100 is changed from an on-state to an off-state, by the CPU 111 from the reset circuit 16.

Turning back to FIG. 3, reference numeral 601 designates an FET that is in an off-state in a case where the active-state control circuit 119 of the main controller 1 outputs a signal, which has a high level and indicates that the DRAM bus 6 is in an active state in which the input/output of a signal is performed. When the FET 601 is in an off-state, electric current does not flow in a resistor 602. An output buffer 121m is put into an output enable state. Thus, a signal, which has a high level and indicates that the CKE signal is active, is inputted to the DRAM 2. Meanwhile, in a case where the FET 601 is in an on-state, electric current flows in the resistor 602. An output buffer 121m is put into a disable state. Thus, while a voltage is supplied thereto from the VT power supply 14, the signal level of the signal line 6i is held at a predetermined holding voltage (that is, a low level) determined by the resistance values of the resistor 303i and the resistor 602. Thus, when the DRAM bus 6 is in an inactive state, the voltage level of the signal line 6i used for outputting the CKE signal is held at a predetermined holding voltage (that is, a low level). Thus, a signal, which has a high level and indicates that the CKE signal is active, can be prevented from being erroneously inputted to the DRAM 2 due to noises notwithstanding an inactive state of the DRAM bus 6.

Turning back to FIG. 9, first, steps S902 and S903 in a case, in which it is determined by the DRAM 2 in step S901 that the CKE signal is active, are described.

In step S902 shown in FIG. 9, the DRAM 2 determines whether the DRAM 2 receives a command through the DRAM controller 115 through the signal line 6d. If it is determined that the DRAM 2 receives the command, the operation proceeds to step S903. If it is determined that the DRAM 2 does not receive the command, the operation returns to step S901.

Subsequently, in step S903 shown in FIG. 9, the DRAM 2 performs processing corresponding to the command received from the DRAM controller 115 through the signal line 6d.

Next, steps S904 to S906 in case, in which the DRAM 2 determines in step S901 shown in FIG. 9 that the CKE signal is not active, are described.

In step S904 shown in FIG. 9, the DRAM 2 performs a self-refresh operation.

Hereinafter, a self-refresh operation of the DRAM 2 is described. Generally, the DRAM holds information therein by storing electric charges at storage elements provided therein. In the DRAM, information of 1 bit is represented by the presence/absence of electric charge at each storage element. Therefore, when the electric charge at the storage element is lost, the information is also lost. That is, data loss occurs. However, each storage element of the DRAM features that in a case where electric charge at each storage element of the DRAM is left without performing an electric charge holding operation, the electric charge leaks therefrom as electric current, and that after lapse of a predetermined time, the electric charge at each storage element runs out. Therefore, it is necessary for preventing data loss to periodically perform an operation of recharging the storage elements. This operation is called "a refresh operation". Incidentally, fundamentally, a refresh operation on storage elements of a DRAM (corresponding to the DRAM 2) is periodically performed by a memory controller (corresponding to the DRAM controller 115) adapted to control the DRAM. Meanwhile, in a case where the DRAM bus 6 is brought into an inactive state, the DRAM controller 115 cannot cause the DRAM 2 to perform a refresh operation. Thus, the DRAM 2 itself performs a refresh operation by using a secondary power supply (corresponding to the secondary battery 803). This operation is called "a self-refresh operation"(or "self-refresh mode").

Incidentally, the DRAM controller 115 transmits a command, which causes the DRAM 2 to perform a self-refresh operation, to the DRAM 2 before outputting a signal, which indicates that the CKE signal is not active, to the DRAM 2 in step S901. After transmitting the command, the DRAM controller 115 controls to inhibit an access to the DRAM 2.

In step S905 shown in FIG. 9, the DRAM 2 determines whether the CKE signal is active. If active, the operation advances to step S906. Otherwise (that is, if inactive), the operation proceeds to step S904.

In step S906 shown in FIG. 9, the DRAM 2 determines whether the DRAM 2 receives a command signal, which indicates that a self-refresh operation is cancelled, from the DRAM controller 115 through the signal line 6d. Incidentally, the DRAM controller 115 sets the CKE signal to be a signal representing an active state. Thereafter, after a lapse of a predetermined time that is sufficient for the VT power supply 14 to output a predetermined output voltage, the DRAM controller 115 transmits a command signal, which indicates that a self-refresh operation is canceled, to the DRAM 2. Incidentally, if the DRAM 2 determines in step S906 that the DRAM 2 does not receive a command signal, which indicates that a self-refresh operation is canceled, the operation returns to step S904, whereupon the DRAM 2 performs a self-refresh operation.

As described above, before the state of the DRAM bus 6 is changed from an active state to an inactive state, the state of the DRAM 2 is changed to a mode, in which a self-refresh operation is performed, in response to a self-refresh command from the DRAM controller 115. After the state of the DRAM bus 6 is changed from an inactive state to an active state, the DRAM 2 cancels a self-refresh operation in response to a self-refresh operation cancellation command issued from the DRAM controller 115. Consequently, the invention can provide a memory system enabled to reliably hold data, which is stored therein, by appropriately performing a refresh operation and a self-refresh operation without causing a malfunction.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-252314 filed Aug. 31, 2004, which is hereby incorporated by reference herein in its entirety.

What is claimed is:

1. A data storage apparatus comprising:
a data storage unit adapted to store data;
a plurality of buffer units, adapted to output data to the data storage unit through a bus, wherein the bus includes a plurality of signal lines, and wherein the plurality of buffer units are provided on the plurality of signal lines;
a determination unit adapted to determine whether the bus is in an operating state in which transmission and reception of data to and from the data storage unit are performed;
a reference voltage supply unit adapted to supply a predetermined reference voltage to the plurality of signal lines, wherein a voltage level of the predetermined reference voltage is lower than that of a first signal level and higher than that of a second signal level; and
a control unit adapted to control, in a case where the determination unit determines that a state of the bus is changed from the operating state to a nonoperating state, an output state of the plurality of buffer units to shift to a predetermined output state so as to reduce an amount of electric current flowing in the bus through the reference voltage supply unit, the predetermined output state being a state in which a part of the plurality of buffers outputs at the first signal level and the other part of the plurality of buffers outputs at the second signal level.

2. The data storage apparatus according to claim 1, further comprising:
a power-supply-voltage supplying unit adapted to supply a predetermined power supply voltage to the data storage apparatus,
wherein the predetermined reference voltage supplied by the reference voltage supply unit is approximately half the power supply voltage supplied by the power-supply-voltage supplying unit.

3. The data storage apparatus according to claim 1, further comprising:
an output state storage unit adapted to store information on the predetermined output state,
wherein the control unit controls the plurality of buffer units to switch the output state to the predetermined output state according to the information on the predetermined output state, which is stored in the output state storage unit.

4. The data storage apparatus according to claim 1, further comprising:
a second determination unit adapted to determine whether the bus is in an active state in which the bus is enabled to perform transmission and reception of data to and from the data storage unit, and
wherein the control unit brings, in a case where the second determination unit determines that the bus is not in the active state, the output state of the plurality of buffer units into a high impedance state.

5. The data storage apparatus according to claim 1,
wherein the data storage unit is a DRAM adapted to perform a predetermined refresh operation so as to hold data, and
wherein the data storage apparatus further comprises a transmission unit adapted to transmit, to the DRAM through the bus, a signal which causes the DRAM to perform the refresh operation.

6. The data storage apparatus according to claim 5,
wherein the DRAM performs a refresh operation in one of a first refresh mode in which the refresh operation is performed according to the signal inputted through the bus which causes the DRAM to perform the refresh operation, and a second refresh mode in which the refresh operation is performed without using the signal which causes the DRAM to perform the refresh operation.

7. The data storage apparatus according to claim 6,
wherein the transmission units transmits a signal, which switches the first refresh mode to the second refresh mode, in response to change of a state of the bus from an active state to an inactive state.

8. The data storage apparatus according to claim 6,
wherein the DRAM performs the refresh operation without responding to a signal inputted through the transmission unit in a case where the DRAM performs the refresh operation in the second refresh mode.

9. The data storage apparatus according to claim 1,
wherein in response to change of a state of the bus from an active state to an inactive state, a state of the reference voltage supply unit changes from a supplying state in which the reference voltage supply unit supplies the reference voltage to the bus to a non-supplying state, in which the reference voltage supply unit does not supply the reference voltage to the bus.

10. A method of controlling a data storage apparatus, comprising the steps of:
determining whether a bus having a plurality of signal lines is in an operating state in which the bus performs transmission and reception of data to and from a data storage unit; and
controlling, in a case where a state of the bus is determined in the determining step to be changed from the operating state to a nonoperating state, an output state of a plurality of buffer units respectively provided on the plurality of signal lines to shift to a predetermined output state so as to reduce an amount of electric current flowing in the bus through a reference voltage supply unit adapted to supply a predetermined reference voltage to the bus,
wherein a voltage level of the predetermined reference voltage is lower than that of a first signal level and higher that than of a second signal level, and
wherein the predetermined output state is a state in which a part of the plurality of buffers outputs at the first signal level and the other part of the plurality of buffers outputs at the second signal level.

11. The method of controlling a data storage apparatus, according to claim 10,
wherein a predetermined power supply voltage is supplied to the data storage apparatus, and
wherein the predetermined reference voltage is approximately half the power supply voltage.

12. The method of controlling a data storage apparatus, according to claim 10, further comprising a step of:
storing information on the predetermined output state,
wherein the controlling step is performed according to the information on the predetermined output state stored in the storing step.

13. The method of controlling a data storage apparatus, according to claim 10, further comprising:
a second determining step determining whether the bus is in an active state in which the bus is enabled to perform transmission and reception of data to and from the data storage unit,
wherein the controlling step includes a step of:
bringing, in a case where the bus is determined in the second determining step not to be in the active state, the output state of the plurality of buffer units into a high impedance state.

14. The method of controlling a data storage apparatus, according to claim 13, further comprising a step of:
controlling the reference voltage supply unit to change a state from a supplying state in which the reference voltage supply unit supplies the reference voltage to the bus to a non-supplying state in which the reference voltage supply unit does not supply the reference voltage to the bus, in response to a determination made in the second determining step which indicates that a state of the bus is changed from an active state to an inactive state.

15. The method of controlling a data storage apparatus, according to claim 10,
wherein the data storage unit is a DRAM adapted to perform a predetermined refresh operation so as to hold data, and
wherein the method further comprises a step of transmitting a signal through the bus which causes the DRAM to perform the predetermined refresh operation.

16. The method of controlling a data storage apparatus, according to claim 15, further comprising a step of:
refreshing the DRAM in one of a first refresh mode in which the refresh operation is performed according to the signal transmitted in the transmitting step and inputted through the bus which causes the DRAM to perform the refresh operation, and a second refresh mode in which the refresh operation is performed without using the signal which causes the DRAM to perform the refresh operation.

17. The method of controlling a data storage apparatus, according to claim 16,
wherein the transmitting step includes a step of transmitting a signal which switches the first refresh mode to the second refresh mode, in response to change of a state of the bus from an active state to an inactive state.

18. The method of controlling a data storage apparatus, according to claim 16,
wherein the refreshing step includes a step of performing, in a case where the DRAM is refreshed in the second refresh mode, the refresh operation without responding to the signal inputted in the transmitting step.

19. Computer-executable process steps for executing the method of claim 10.

20. A computer-readable storage medium for storing the computer-executable process steps of claim 19.

* * * * *